United States Patent [19]

Ahnsorge

[11] 3,757,587
[45] Sept. 11, 1973

[54] DEVICE FOR TESTING THE TIGHTNESS OF CONTAINERS

[75] Inventor: Jurgen Ahnsorge, Hamburg, Germany

[73] Assignee: Hans Schwarzkopf GmbH, Hamburg, Germany

[22] Filed: May 6, 1970

[21] Appl. No.: 35,205

[30] Foreign Application Priority Data
May 6, 1969 Germany.................. P 19 23 012.7

[52] U.S. Cl. ................................................. 73/45.4
[51] Int. Cl. ............................................ G01m 3/16
[58] Field of Search...................... 73/40.7, 40, 49.2, 73/49.3, 37, 45.1, 41.4, 41; 219/10.69

[56] References Cited
UNITED STATES PATENTS
3,251,976  5/1966  McBrien .......................... 219/10.69

FOREIGN PATENTS OR APPLICATIONS
1,063,006  3/1967  Great Britain ....................... 73/49.3

Primary Examiner—S. Clement Swisher
Attorney—Bacon and Thomas

[57] ABSTRACT

An apparatus for testing the tightness of containers such as aerosol containers in which there are means for heating the containers, means for detecting leakage of gases from the containers and means for removing containers having leaks. The containers are heated by a high frequency electrical field and passed through a suction detecting means which actuates the container removal means upon detection of any leaked gases.

1 Claim, 3 Drawing Figures

Patented Sept. 11, 1973

INVENTOR.
JURGEN AHNSORGE

BY Bacon + Thomas

Agent

DEVICE FOR TESTING THE TIGHTNESS OF CONTAINERS

The invention relates to a device for testing the tightness of containers, especially aerosol cans.

The law requires that aerosol cans be heated to 50°C after being filled. At this temperature, the internal pressure in the can, which at a normal temperature of 20°C amounts to about three atmospheres, rises to about seven atmospheres. If the aerosol can withstands this pressure without damage, it may be released for sale.

The cans are also normally tested for tightness, and cans having leaks are not used, since even at the normal temperature of 20°C, any leak in the can results in the slow escape of the propellant gas and after a brief period of the storage the can contains the active substance but no more propellant gas. This makes it impossible for the consumer to remove the active substance from the can.

Aerosol cans have hitherto been heated in a water bath, the temperature of which is somewhat above 60°C. In this type of testing carried out in a water bath, cans having leaks are recognized by the bubbles of propellant gas issuing to a greater or lesser degree from the fully immersed can. This requires a crew of one or two men to observe the cans as they pass through the bath and to remove leaky cans by hand. Apart from the fact that this is not a sure means of detecting defective cans, the crew is in great danger of being injured, since it is quite possible for a can heated to 60°C to explode.

The test baths have a capacity of up to 500 aerosol cans. This means that the water baths are up to twenty metres in length and therefore require a considerable amount of space. The water in the bath is heated by means of electrical heater bars or steam coils, the water temperature being kept constant by means of thermostats. The temperature of water baths of this kind is dependent upon, among other things, the speed at which the aerosol cans travel through the bath, since the said cans pick up a certain amount of heat as they pass through the bath. If the throughput of cans is high, so much heat may be removed from the bath that the water temperature may quite easily drop below 60°C. In that case the cans would leave the bath at a temperature below 50°C, so that the test pressure required by law cannot be maintained at a high throughput of cans. The water bath also has other deficiencies. For example, the pressure and/or tension of the water may not allow the gas to escape when the leak is small, and bubbles frequently emerge unnoticed if they are very small.

Another disadvantage of using water baths is that the cans must pass to a drying unit after passing through the bath. This is necessary because the upper portion and head of the conventional aerosol can are usually concave and water collects in these cavities and remains therein after the can leaves the water bath. Unless this water is removed and the can is dried, a danger of corrosion exists.

It is the special aim of the invention to eliminate the disadvantages of the known method of testing containers for tightness, and to produce a device in which the internal pressure is higher than the external pressure, whereby testing for tightness may be carried out very simply, very rapidly, and with no danger to the operating crew.

According to the invention, this aim is accomplished by heating the cans by means of a device operating at high frequency and by using a suction detector device for detecting leaky cans.

According to the present invention, after being filled with the solution of active material and propellant gas, the aerosol cans pass through a high frequency field, where they are heated to the required test temperature within about ten seconds. In view of the ease and rapidity with which high-frequency energy can be controlled, it is easily adapted to the throughput of cans, and fluctuations in the number of aerosol cans to be tested have no effect upon the amount of energy absorbed per can. In other words, cans of the same content leave the high-frequency field at the same temperature, i.e. a temperature of substantially 50°C. This makes it possible to maintain pressure tolerances much closer than those obtainable with existing methods of operation.

After leaving the high-frequency field, the cans pass on a conveyor to the detector device where they are tested for leaks. The suction detector device will preferably have a housing containing a passage for the cans, the width of the said passage approximates the width or diameter of the can to be tested, and the said passage contains a plurality of detectors.

The detector device preferably has a suction tube or hose, the free end of which is connected to the can passage while the other end is connected to the suction side of a constantly driven blower, the pressure side of which is connected to the detector electrode.

Additional characteristics essential to the invention may be gathered from the following description.

The invention is described hereinafter, by way of example, with reference to the drawings.

The leak-testing unit according to the invention has an endless conveyor 10 on which the cans pass consecutively through the heating device, the detector device, and the sorting device.

The conveyor 10 has an endless belt 11 and a sliding track 11a, preferably of wood or plastic, so that there is little friction between conveyor belt 11 and track 11a. Guide strips 11b are provided laterally of the said conveyor belt 11.

Figure 1:
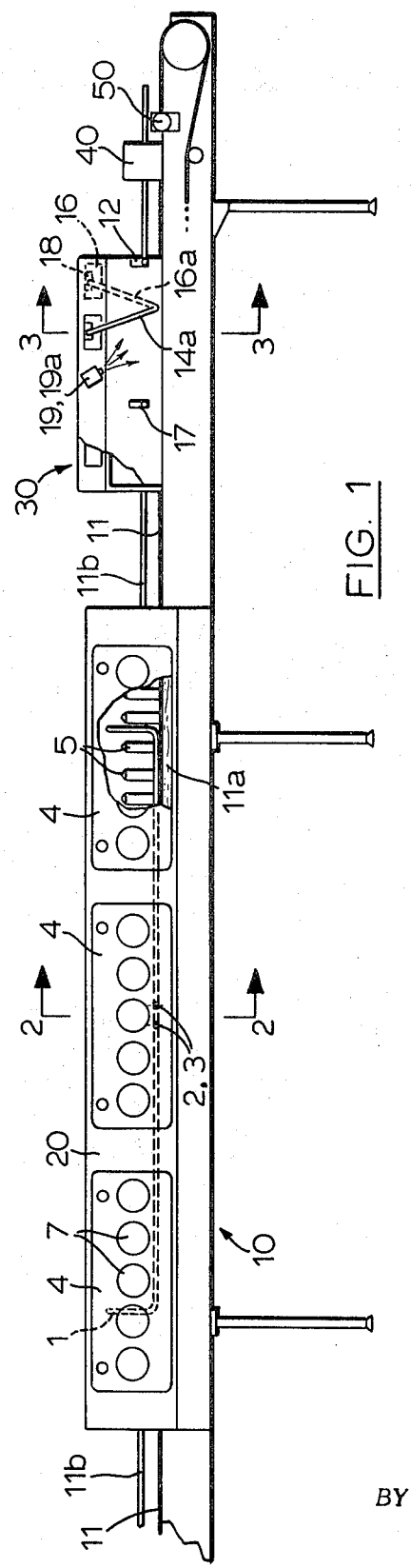
FIG. 1 is a schematic side elevation in part section of a unit according to the invention.

The heating device has a high-frequency coil 1 provided with power from a source not shown in the drawing. Coil 1 is provided with a tube made of electrically conductive material such as copper, the beginning and end of the said tube being tunnel-shaped, while the legs thereof run substantially horizontally between these ends on each side of the can track, as shown in FIG. 1 in dotted lines. Coil 1 is preferably hollow so that a coolant, for example water, may circulate through the coil tube. The electric power connections and the inlet and outlet for the coolant are marked 2 and 3.

If the cans to be tested are made of sheet metal, it is of advantage for the power to be in the frequency range between 400 – 500 KHz and in the medium wave range. A shorter wave length may be used for plastic cans.

For the purpose of shielding the high-frequency coil from its environment, a jacket 20, preferably of sheet copper, is provided which surrounds the coil substantially completely. Jacket 20 surrounds coil 1 on all sides. Arranged on one lateral wall of jacket 20, in spaced relationship to each other, are one or more removable covers 4 provided with observation windows, so that cans 5 travelling through the heating unit may be observed from the outside.

Figure 2:
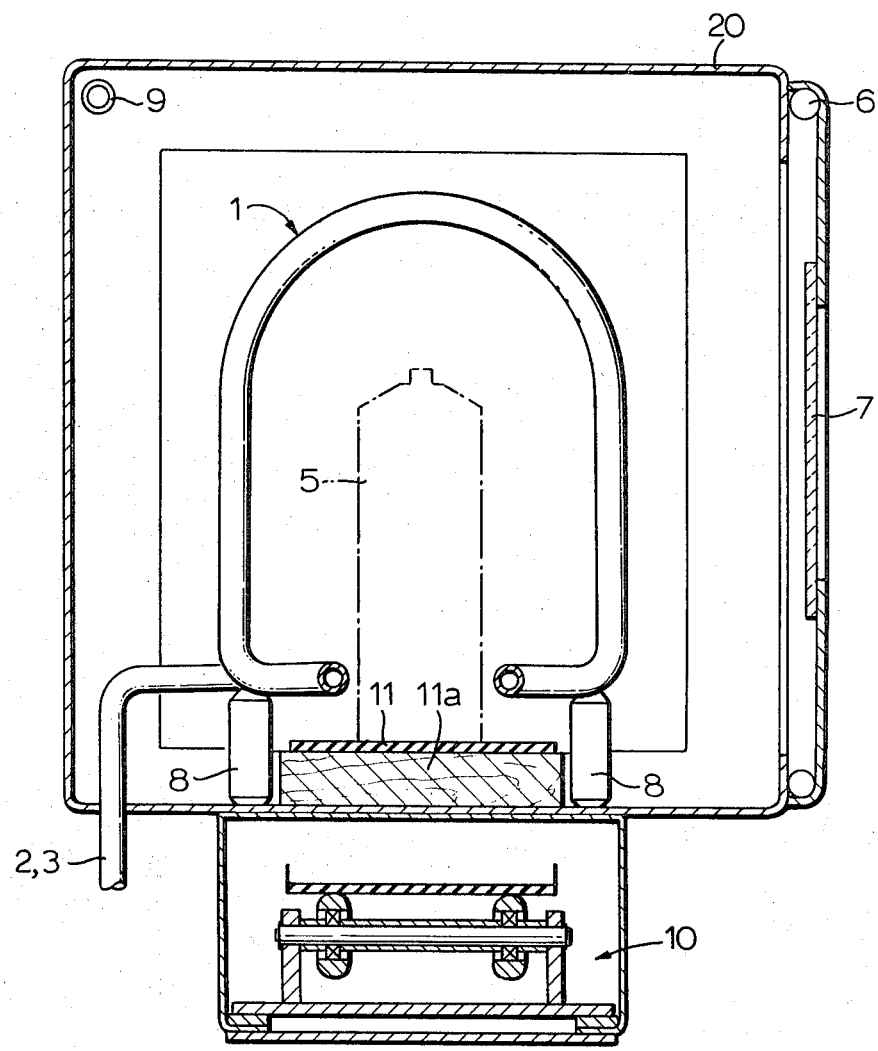
FIG. 2 is a sectional view along the line 2—2 in FIG. 1.

Each cover 4 is provided with an electric safety lock which automatically cuts off the supply of power to high-frequency coil 1 when a cover is removed. The relevant safety contacts 6 are shown in FIG. 2. In order that the cans travelling through the high-frequency device may be properly observed, lighting may be provided within shielding 20. Internal illumination of this kind is indicated schematically at 9.

High-frequency coil 1 is insulated from the frame of conveyor 10 and from shielding 20. This may be accomplished, for example, by means of insulating supports 8, of which two are illustrated in FIG. 2.

In order that the run of conveyor 11 passing through the coil chamber may be insulated, this run passes over an insulating element 11a extending over the length of the heating chamber and preferably made of hardwood, hard rubber, or the like. In other words, the device insulating the top run of conveyor 11 is made of a material having a low coefficient of friction. This prevents the build up of harmful stresses both in shielding 20 and in the metal parts of the conveyor frame.

As shown in FIG. 2, the bottom run of conveyor 11 runs in a channel formed below the heating chamber. Details of the conveying device are not given, since they are not a part of the invention.

The heating device is supported as a whole in an appropriate fashion for instance by means of supports such as those shown in FIG. 1.

Figure 3:
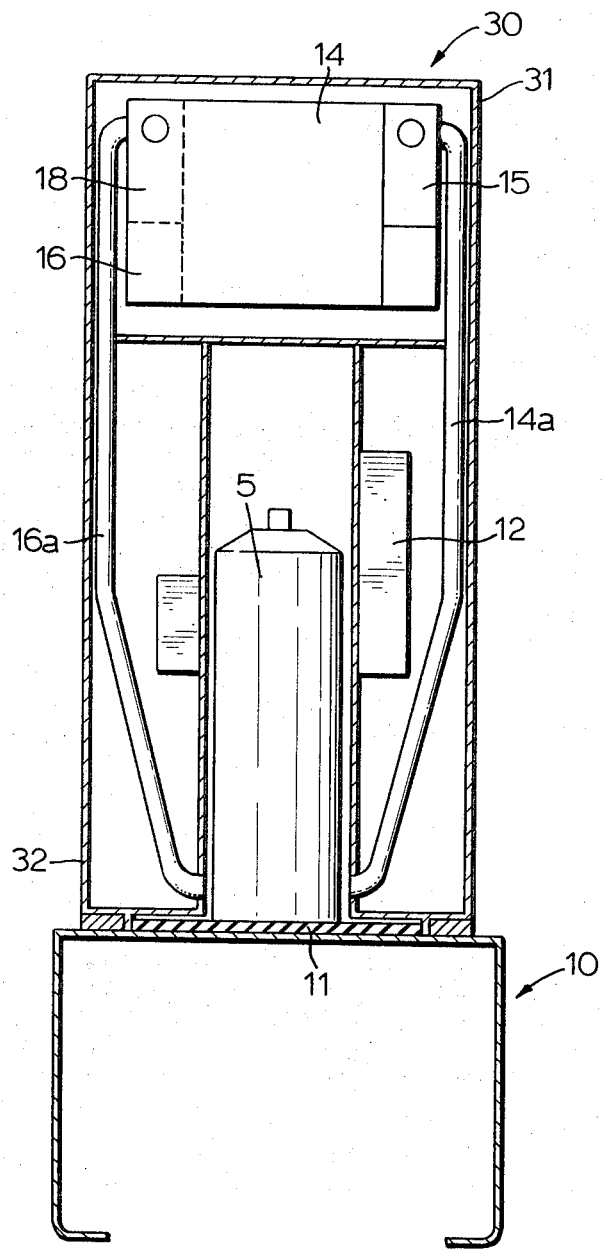
FIG. 3 is a sectional view along the line 3—3 in FIG. 1.

The heating device is followed by a detector device 30, the latter having a chamber consisting of an upper box 31 and two lateral boxes 32, between which there is a passage for cans 5 (FIG. 3).

Arranged one behind the other in upper box 31 are one or more groups of detectors. Each group has two detectors with suction hoses or tubes communicating at one point with the can track which is preferably located about twenty mm above conveyor 11. It was found that this location produces a satisfactory response from the detectors, mainly because the gases emerging from a leak (fluorinated-chlorinated hydrocarbons) are heavier than air.

Located in the inlet region to detector chamber 31, 32 is a light barrier 17 consisting of a source of light and a photo-electric cell. At the outlet from detector chamber 31, 32 is another light barrier 12 consisting of a source of light and a photo-electric cell. The individual groups of detectors are arranged between the two light barriers 17 and 12. In the embodiment described, only one group of detectors is provided, consisting of detectors 14 and 16. Each detector has a hose 14a, 16a made of plastic which, as shown in FIG. 3, runs downwardly from the detector housing and communicates with the can passage. The exact way in which the hose passes to the junction with the can passage is not critical.

Each detector 14, 16 has a suction blower (not shown) which is switched on at the start of the testing operation and thereafter operates continuously. Arranged on the suction side of the blower is a change-over valve 15, 18 which connects the suction side of the blower selectively to suction hose 14a, 16a or to outside atmosphere. Arranged between first light barrier 17 and detector group 14, 16, according to the drawing, is an air-supply device, the outlet aperture of which points generally forwards and downwards in relation to the direction of motion of cans 5. The said air-supply device has a blower 19 and a compressed-air valve 19a. The purpose of this will be described hereinafter.

The detectors are in the form of suction detectors. This means that the atmosphere to be investigated is drawn into the detector, the components in the medium drawn-in, which are to be detected, being placed or deposited upon an electrode or the like. The electrode responds to the deposition of such materials, and delivers a signal indicating the presence thereof. Thereafter, in order to be prepared for a new test, the electrode must be regenerated, i.e. the materials placed or deposited thereon must be removed. In known detectors, this is usually accomplished by burning the material off.

The detector device is succeeded by a selecting or ejecting device 40 which may be of conventional design having, for example, an electro-magnetically operated switch-point or a device operating with compressed air which pushes the cans out as required.

Ejecting device 40 is succeeded by a safety switch 50 coupled to conveyor 11. This immediately cuts off the supply of power to high-frequency coil 1 if the said conveyor comes to a halt. This effectively prevents any overheating of cans 5 in the heating chamber if conveyor 11 is inadvertently stopped.

The throughput of cans may be increased by selecting an appropriate number of detectors.

Detector device 30 operates as follows:

When the device is started up, change-over valves 15, 18 are set in such a manner that the suction blowers of detectors 14, 16 are connected to the atmosphere. However, one of detectors 14, 16 is arranged to be in a state of readiness so that, after an additional signal "s" is applied, the detector which is in the state of readiness can be switched to the testing state, in which the suction hose is connected to the suction side of the blower.

If a can passes light barrier 17, this produces a signal which switches detector 14 or 16, whichever is in the readinesss stae, into the testing state, this being accomplished by changing over valve 15, 18. Assuming that can 5 has no leak, the detector which is in the testing state does not respond. When can 5 passes through rear light barrier 12, another signal is produced, and this changes over detectors 14, 16 in such a manner that the detector hitherto in the testing state now passes to the inactive position, while the detector hitherto in the inactive position now passes into the readiness state. Assuming that incoming can 5 has a leak, the detector which is in the testing state responds and produces a signal. This signal is released when can 5 passes through second light barrier 12, and is applied to ejecting device 40. A delay is used to ensure that the ejecting device becomes effective at the moment when the can in question reaches it.

In the case of a leaky can, when the can passes light barrier 12, the detectors are switched over as described above, and the signal produced when the said can passes through light barrier 12 is used to activate air-supply device 19, 19a for a short time, in order to restore the atmosphere in the can passage to its original state. The main purpose of this is to prevent the detectors from responding erroneously. Whether blower 19 of compressed-air valve 19a is used depends upon the throughput of cans. If the throughput is low, the relatively low pressure of blower 19 is sufficient; for high throughputs, the higher pressure from valve 19a is used.

In its simplest form, ejecting device 14 may have a compressed-air nozzle, actuated as described above and blowing the relevant can off the conveyor.

According to another preferred embodiment, ejecting device 40 may exhibit a switch-point. When this is actuated, the guide strips on conveyor 11 in the vicinity of ejecting device 40 are moved sideways, so that the rejected can is carried away by conveyor 11 on to another track. A turntable, for example, may be used to collect rejected cans. When the turntable is full, the cans are removed in order to be destroyed.

What I claim as my invention is:

1. Apparatus for testing the tightness of containers as the containers move through the apparatus, the apparatus comprising:

means adapted to pass the containers through the apparatus;

means fixedly positioned adjacent the passing means for heating the containers;

detecting means fixedly positioned adjacent the passing means to receive containers from the heating means and comprising: a housing having a passage through which the containers pass; a pair of gas detectors adapted to detect the presence of gas leaking from the containers; gas removing means adapted to direct gases from the passage to the gas detector, the gas removing means including a blower and a pair of tubes having respective first ends connected to the passage and respective other ends connected to the suction side of the blower and valve means coupled to the tubes for selectively connecting the tubes either to the blower or to atmosphere; the detector means further comprising: first light barrier means on the side of said detector near the entrance to said passage and capable of actuating said valve means upon passage of a container past said first light barrier to connect the tube of one of said detectors to the blower, and a second light barrier means on the side of the detector near the exit from said passage capable of actuating said valve means upon passage of a container past said second light barrier to disconnect the tube of said connected detector from the blower and connect the tube of the other detector to said blower; and means operable by said detecting means and adapted to remove leaking containers from the passing means.

* * * * *